US009598608B2

(12) United States Patent
Boday et al.

(10) Patent No.: US 9,598,608 B2
(45) Date of Patent: Mar. 21, 2017

(54) SOLUBLE, PROCESSABLE POLYHEMIAMINALS AND POLYHEXAHYDROTRIAZINES

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/571,130

(22) Filed: Dec. 15, 2014

(65) Prior Publication Data

US 2015/0376442 A1 Dec. 31, 2015

Related U.S. Application Data

(63) Continuation of application No. 14/317,468, filed on Jun. 27, 2014.

(51) Int. Cl.
*B05D 3/02* (2006.01)
*C09D 179/04* (2006.01)
(Continued)

(52) U.S. Cl.
CPC ............ *C09D 179/04* (2013.01); *B05D 1/30* (2013.01); *C08G 12/08* (2013.01);
(Continued)

(58) Field of Classification Search
CPC .. C09D 171/00; C09D 179/04; C09D 161/22; C08G 65/00; C08G 12/08;
(Continued)

(56) References Cited

U.S. PATENT DOCUMENTS 2,889,277 A 6/1959 Hughes
3,340,232 A 9/1967 Smith et al.
(Continued)

FOREIGN PATENT DOCUMENTS

CN 101265255 A 9/2008
EP 2636697 A1 9/2013
(Continued)

OTHER PUBLICATIONS

Supplementary Materials for Garcia et al. Science AAAS, vol. 344, May 16, 2014, pp. 732-735.*
(Continued)

*Primary Examiner* — Robert S Walters, Jr.
(74) *Attorney, Agent, or Firm* — Patterson + Sheridan, LLP

(57) ABSTRACT

Polyhexahydrotriazine (PHT) and polyhemiaminal (PHA) materials incorporating divalent or trivalent bridging groups tend to form highly cross-linked polymers. While highly cross-linked polymers have certain advantageous with respect to stability and various physical characteristics, they are difficult to process once formed. PHA and PHT materials incorporating a plurality of trivalent PHA/PHT groups, a plurality of divalent bridging groups, and a plurality of monovalent end groups are disclosed. According to an embodiment, the cross-link density and molecular weight can be controlled by the inclusion of the end groups. Lower cross-link density and molecular weight give PHA and PHT materials improved characteristics with respect to film and fiber formation methods. A method of coating a component or substrate with a polymer is also disclosed. Embodiments of the method can be used to form either a PHA or PHT film on a substrate, such as microelectronic component.

20 Claims, 10 Drawing Sheets

(51) Int. Cl.
| | |
|---|---|
| *B05D 1/30* | (2006.01) |
| *C08G 12/08* | (2006.01) |
| *C09D 161/22* | (2006.01) |
| *C08G 73/02* | (2006.01) |
| *C08G 73/06* | (2006.01) |

(52) U.S. Cl.
CPC ..... *C08G 73/0273* (2013.01); *C08G 73/0638* (2013.01); *C09D 161/22* (2013.01)

(58) Field of Classification Search
CPC ............ C08G 73/0273; C08G 73/0638; B05D 3/0254; B05D 1/30
USPC ...................................................... 427/385.5
See application file for complete search history.

(56) References Cited

U.S. PATENT DOCUMENTS

| | | | |
|---|---|---|---|
| 3,349,779 | A | 10/1967 | Leonard et al. |
| 3,598,748 | A | 8/1971 | Hirosawa |
| 3,957,742 | A | 5/1976 | Kveton |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,877,451 | A | 10/1989 | Winnik et al. |
| 5,112,796 | A | 5/1992 | Iannicelli |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 2009/0039018 | A1 | 2/2009 | Jordi et al. |
| 2010/0107476 | A1 | 5/2010 | Cosimbescu |
| 2012/0049308 | A1 | 3/2012 | Nishimura et al. |
| 2015/0104579 | A1* | 4/2015 | Hedrick ................. C08G 65/00 427/385.5 |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |
| WO | 2015051715 A1 | 4/2015 |

OTHER PUBLICATIONS

U.S. Appl. No. 14/317,468, entitled Soluble, Processable Polyhemiaminals and Polyhexahydrotriazines, filed Jun. 27, 2014. Appendix P: List of IBM Patents or Patent Applications Treated as Related.

Henri Ulrich et al., Reaction of Chloromethyl Ether with Primary Amines, May 1961, pp. 1637-1638.

Hemant S. Patel et al., Studies on Synthesis and Characterization of some Novel Aromatic Copolyesters based on s-Triazine, Iranian Polymer Journal, vol. 14, No. 12, 2005, pp. 1090-1098.

Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.

Wang Yulan et al., Synthesis and Properties of Poly-1, 3, 5-Triazines, Polymer Communications, No. 2, 1984, pp. 117-123.

John Markoff, Error at IBM Lap Finds New Family of Materials, New York Times, May 15, 2014, 4 pages.

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

T. Okita, Filter method for the determination of trace quantities of amines, mercaptans, and organic sulphides in the atmosphere, Atmospheric Environment (1967), vol. 4, Issue 1, Jan. 1970, pp. 93-102.

Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Hiller, et al., "Laser-engravable hexahydrotriazine polymer networks," Mat Res Innovat (2002) 6:179-184.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," NatureMaterials_Aug. 13, 2004, 545-550;Published online: Jul. 11, 2004;.

Search Report and Written Opinion mailed on Nov. 24, 2015 in corresponding International Application No. PCT/US15/37690, 12 pages.

\* cited by examiner

SOLUBLE, PROCESSABLE POLYHEMIAMINALS AND POLYHEXAHYDROTRIAZINES

CROSS-REFERENCE TO RELATED APPLICATIONS

This application is a continuation of co-pending U.S. patent application Ser. No. 14/317,468, filed Jun. 27, 2014. The aforementioned related patent application is herein incorporated by reference in its entirety. Synthetic details and characterization of various example polyhexahydrotriazine and polyhemiaminal materials are provided in commonly assigned, co-pending application Ser. No. 14/050,995, filed in the USPTO on Oct. 10, 2013, the entirety of which is incorporated herein by reference.

BACKGROUND

The present disclosure relates to polymeric materials including hexahydrotriazine or hemiaminal moieties, and more specifically to polyhemiaminals and polyhexahydrotriazines.

Commercially important nitrogen-containing polymers include polyamides (nylon), polyimides (Kaplon, UPILEX, VTEC), and polyamines. Between these three classes of materials, nitrogen-rich polymers have applications in adhesives, semiconductors, automotive components, electronics, sporting goods, coatings, bottles, foams, yarns, plumbing parts, paints, and hospital equipment, to name a few. Though widely used, nitrogen-containing polymers can be flexible, hygroscopic materials sensitive to acids, bases and oxidants, which prevents their use in other applications.

In general, highly crosslinked, non-linear polymers are more difficult to process into films and fibers than more linear polymers that are not highly crosslinked. A need exists for chemically resistant nitrogen-containing polymers that have high rigidity and high tensile strength, but are processable into films and fibers.

SUMMARY

A polyhemiaminal (PHA) is a polymer comprising: i) a plurality of trivalent hemiaminal groups of formula:

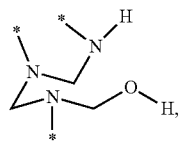

covalently linked to ii) a plurality of bridging groups of formula:

and
iii) a plurality of end groups of formula:

wherein y' is 2 or 3, and K' is a divalent or trivalent radical comprising at least one 6-carbon aromatic ring, and K" is a monovalent radical comprising at least one 6-carbon aromatic ring. Each starred bond of a given hemiaminal group is covalently linked to a respective one of the bridging groups or the end groups. Starred bonds represent attachment points to other portions of the chemical structure. Additionally, each starred bond of a given bridging group or a given end group is covalently linked to a respective one of the hemiaminal groups.

In the polymeric material, an overall ratio of K' to K" groups is less than 3:1 and greater than or equal to 1:2. That is, some but not all trivalent hemiaminal groups in the polymer can have only K' groups attached thereto. And, of course, on any given trivalent hemiaminal group, the number of K" groups cannot exceed 2 if the group is incorporated into the PHA polymer.

In an embodiment, a polyhexahydrotriazine (PHT) is a polymer comprising i) a plurality of trivalent hexahydrotriazine groups of formula:

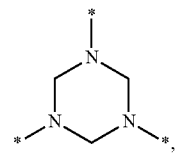

covalently linked to ii) a plurality of divalent bridging groups of formula:

(where y'=2 or 3); and
iii) a plurality of monovalent bridging groups K" of formula

Each starred bond of a given hexahydrotriazine group is covalently linked to a respective one of the bridging groups K' or a respective one of the end groups K". And K' is a divalent or trivalent radical comprising at least one 6-carbon aromatic ring, and K" is a monovalent radical comprising at least one carbon. In an embodiment, K" is a monovalent radical comprising at least one 6-carbon aromatic ring. Each starred bond of a given bridging group or a given end group is covalently linked to a respective one of the hexahydrotriazine groups. The overall ratio of bridging groups (K') to end groups (K") in the PHT polymer is less than 3:1 and greater than or equal to 1:2.

Also disclosed is a method of forming a polymer coating on a component, comprising: forming a PHA film on a component, heating the PHA film to a first temperature that is above a glass transition temperature of the PHA film, heating the PHA film to a second temperature that is greater than the first temperature, wherein the PHA film, comprises a plurality of trivalent hemiaminal groups having the structure:

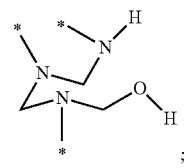

and
a plurality of bridging groups of formula:

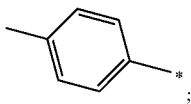

and
a plurality of monovalent end groups of formula: W'

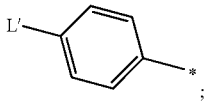

wherein W' is selected from the group consisting of: —H, —NH(R'), —N($R^2$)($R^3$), —OH, —O($R^4$), —S($R^5$), —P($R^6$), —$R^7$, —$CF_3$, and combinations thereof, wherein $R^1$ comprises at least 1 carbon, $R^2$ comprises at least 1 carbon, $R^3$ comprises at least 1 carbon, $R^4$ comprises at least 1 carbon, $R^5$ comprises at least 1 carbon, $R^6$ comprises at least 1 carbon, $R^7$ comprises at least one carbon, and each of $R^1$-$R^7$ may be independent or the same. Each starred bond of a given hemiaminal group is covalently linked to a respective one of the bridging groups or a respective one of the monovalent end groups. Each starred bond of a given bridging group is linked to one of the hemiaminal groups. And each starred bond of a given monovalent end group is linked to one of the hemiaminal groups. The second temperature is at or above a temperature at which the PHA film converts to a polyhexahydrotriazine (PHT) film.

As used herein, a "component" is a rigid or semi-rigid substrate. A component may be, without limitation, a printed circuit board, a microchip, a semiconductor device, a light-emitting diode, a semiconductor wafer, a hard disk drive platter, a pipewall, a filter medium, a countertop, a door handle, or a portion of any of the foregoing.

The above-described and other features and advantages of the present invention will be appreciated and understood by those skilled in the art from the following detailed description, drawings, and appended claims.

DETAILED DESCRIPTION

Figure 1:
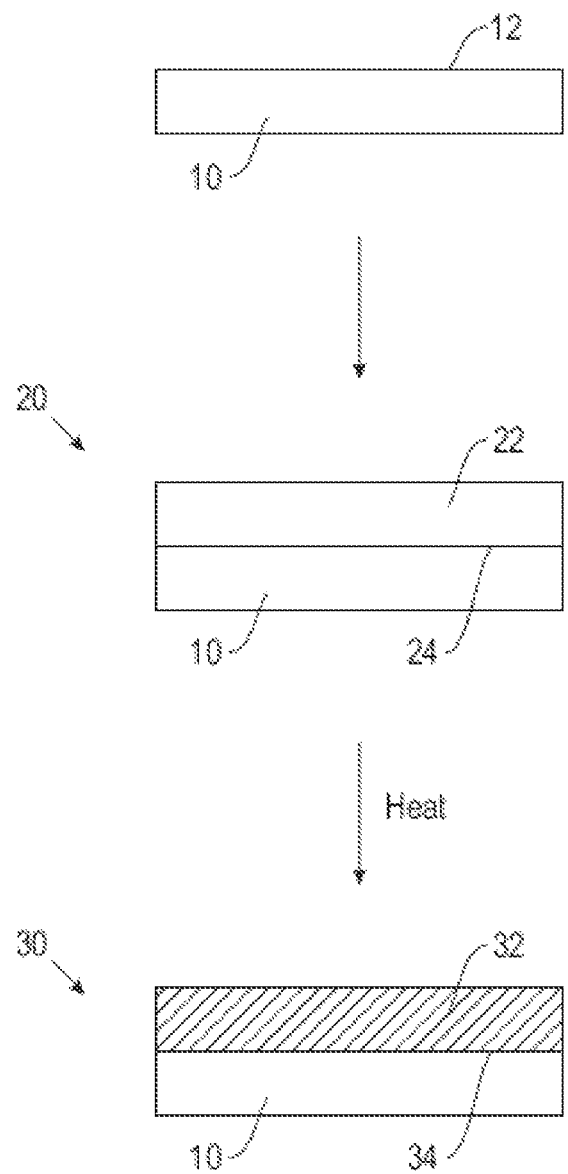
FIG. 1 is a series of cross-sectional layer diagrams illustrating the preparation of a polyhemiaminal (PHA) film.

Methods are disclosed for preparing polyhemiaminals (PHAs) and polyhexahydrotriazines (PHTs) by the reaction of aromatic amines, aromatic diamines, and paraformaldehyde. Aliphatic diamines may also be adopted in some embodiments. The PHAs and PHA films are stable intermediates in the preparation of the PHTs and PHT films, respectively. The PHAs are generally prepared at a temperature of about 20° C. to about 120° C., more preferably at about 20° C. to about 100° C., and further preferably at about 40° C. to about 60° C. The PHAs form films when cast from a polar aprotic solvents (e.g., NMP), and the PHA films are stable at a temperature of about 20° C. to less than 150° C. The PHA films can have a Young's modulus of about 6 GPa, which is exceptionally high for an organic film. PHA materials are also melt processable as well so can be used to in molding and extrusion applications.

The PHT films are formed by thermally treating a PHA film at a temperature of at least 150° C., preferably about 165° C. to about 280° C., more preferably about 180° C. to about 210° C., and most preferably about 190° C. to about 210° C. for a period of time of about 1 minute to about 24 hours, and more preferably about 1 hour. The PHT films can have high heat resistance as measured by dynamic mechanical analysis (DMA). The PHT films can also have a high Young's modulus as measured by nanoindentation methods. In some instances, the Young's modulus of a PHT film can have a value in a range of about 8 GPa to about 14 GPa, exceeding that of bone (9 GPA).

In an embodiment, a polyhemiaminal (PHA) comprises i) a plurality of trivalent hemiaminal groups of formula:

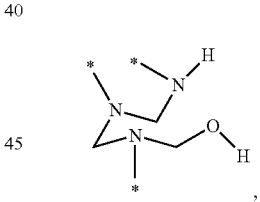

covalently linked to ii) a plurality of bridging groups of formula:

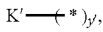

and
iii) a plurality of end groups of formula:

wherein y' is 2 or 3, and K' is a divalent or trivalent radical comprising at least one 6-carbon aromatic ring, and K' is a monovalent radical comprising at least one 6-carbon aromatic ring. In the polymeric material, an overall ratio of K' to K" groups will be less than 3:1 and greater than or equal to 1:2. That is, some but not all trivalent hemiaminal groups in the polymer can have only K' groups attached thereto. And, of course, on any given trivalent hemiaminal group, the number of K" groups cannot exceed 2 if the group is incorporated into the PHA polymer. Starred bonds represent attachment points to other portions of the chemical structure. Each starred bond of a given hemiaminal group is covalently linked to a respective one of the bridging groups or the end groups. Additionally, each starred bond of a given bridging group or a given end group is covalently linked to a respective one of the hemiaminal groups.

In some embodiments, a polyhemiaminal (PHA) comprises, a plurality of trivalent hemiaminal groups having the structure:

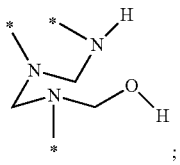

a plurality of bridging groups of formula:

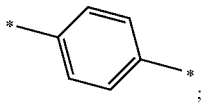

and
a plurality of monovalent end groups of formula:

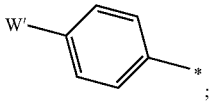

wherein W' is selected from the group consisting of: —H, —NH(R'), —N(R$^2$)(R$^3$), —OH, —O(R$^4$), —S(R$^5$), —P(R$^6$), —R$^7$, —CF$_3$, and combinations thereof, wherein R$^1$ comprises at least 1 carbon, R$^2$ comprises at least 1 carbon, R$^3$ comprises at least 1 carbon, R$^4$ comprises at least 1 carbon, R$^5$ comprises at least 1 carbon, R$^6$ comprises at least 1 carbon, R$^7$ comprises at least one carbon, and each of R$^1$-R$^7$ may be independent or the same. Each starred bond of a given hemiaminal group is covalently linked to a respective one of the bridging groups or a respective one of the monovalent end groups. Each starred bond of a given bridging group is linked to one of the hemiaminal groups. And each starred bond of a given monovalent end group is linked to one of the hemiaminal groups.

As an example, a polyhemiaminal can be represented herein by formula (8):

(1)

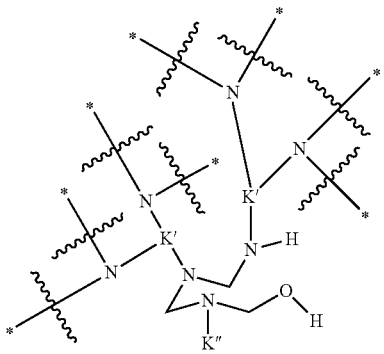

In this instance, each K' is a trivalent radical (y'=3) comprising at least one 6-carbon aromatic ring and K" is a monovalent radical comprising at least one 6-carbon ring. It should be understood that each nitrogen having two starred wavy bonds in formula (1) is a portion of a different hemiaminal group. The inclusion of K" reduces the number of potential crosslink connection points in the polyhemiaminal network.

Non-limiting exemplary trivalent bridging groups include:

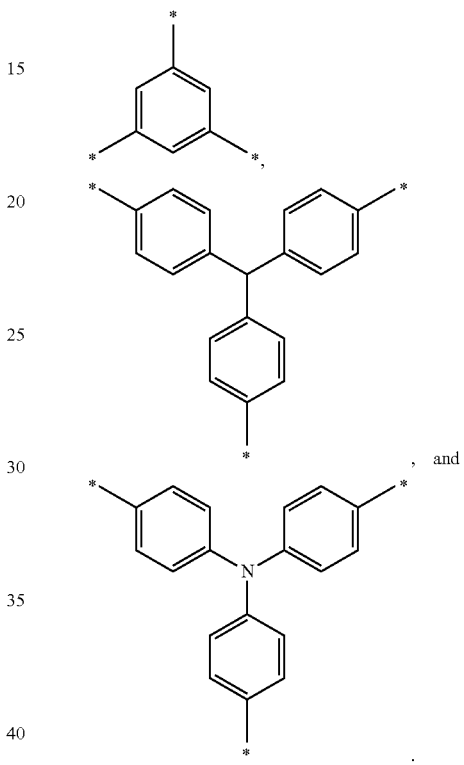

, and

The bridging groups can be used singularly or in combination. The remainder of the description discusses divalent bridging groups K'. It should be understood that the methods and principles below also apply to trivalent linking groups.

Polyhemiaminals composed of divalent bridging groups K' and monovalent end groups K" can be represented herein by formula (2):

(2)

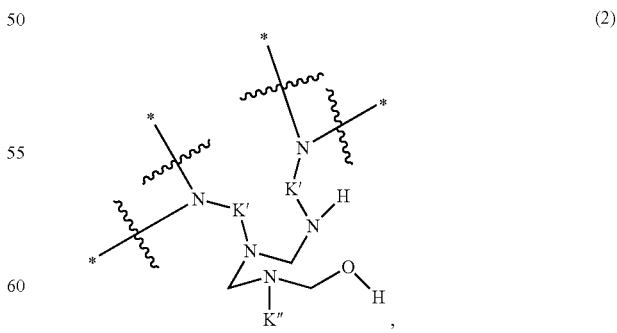

wherein K' is a divalent radical (y'=2) comprising at least one 6-carbon aromatic ring, and K" is a monovalent radical comprising at least one 6-carbon aromatic ring. Each nitrogen having two starred wavy bonds in formula (2) is a portion of a different hemiaminal group.

Certain bridging groups K' have the formula (3):

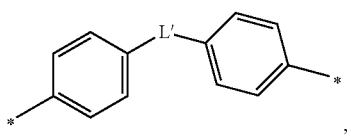

(3)

wherein L' is a divalent linking group selected from the group consisting of *—O—*, *—S—*, *—N(R')—*, *—N(H)—*, *—R"—*, *—P(R"')—* and combinations thereof, wherein R', R", and R"' independently comprise at least 1 carbon. In an embodiment, R', R", and R"' are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

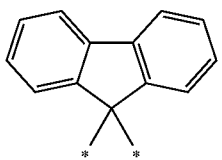

And, as described above, a bridging group can also be of the formula (4):

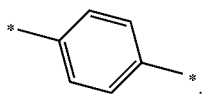

(4)

Polyhemiaminals composed of divalent bridging groups of formula (3) and monovalent end groups K" can be represented herein by formula (5):

wherein L' is a divalent linking group selected from the group consisting of *—O—*, *—S—*, *—N(R')—*, *—N(H)—*, *—R"—*, *—P(R"')—* and combinations thereof, wherein R', R", and R"' independently comprise at least 1 carbon. K" is again a monovalent end group including at least one 6-carbon aromatic ring. Each nitrogen having two starred wavy bonds in formula (5) is a portion of a different hemiaminal group.

An embodiment of a polyhexahydrotriazine (PHT) comprises, i) a plurality of trivalent hexahydrotriazine groups of formula:

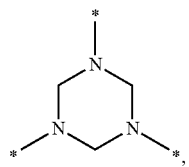

covalently linked to ii) a plurality of divalent bridging groups of formula:

(where y'=2 or 3); and
iii) a plurality of monovalent bridging groups K" of formula

Each starred bond of a given hexahydrotriazine group is covalently linked to a respective one of the bridging groups K' or a respective one of the end groups K". And K' is a divalent or trivalent radical comprising at least one 6-carbon aromatic ring, and K" is a monovalent radical comprising at least one carbon. In an embodiment, K" is a monovalent radical comprising at least one 6-carbon aromatic ring. Each starred bond of a given bridging group or a given end group (4)

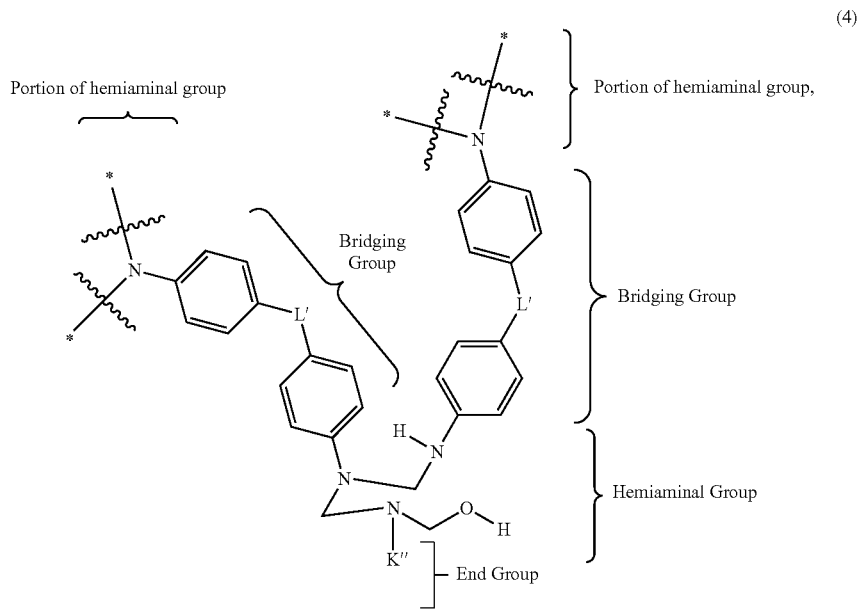

is covalently linked to a respective one of the hexahydrotriazine groups. The overall ratio of bridging groups (K') to end groups (K") in the PHT polymer is less than 3:1 and greater than or equal to 1:2.

For PHTs comprising bridging groups of formula (3) and end groups K", the polyhexahydrotriazine is represented herein by formula (6):

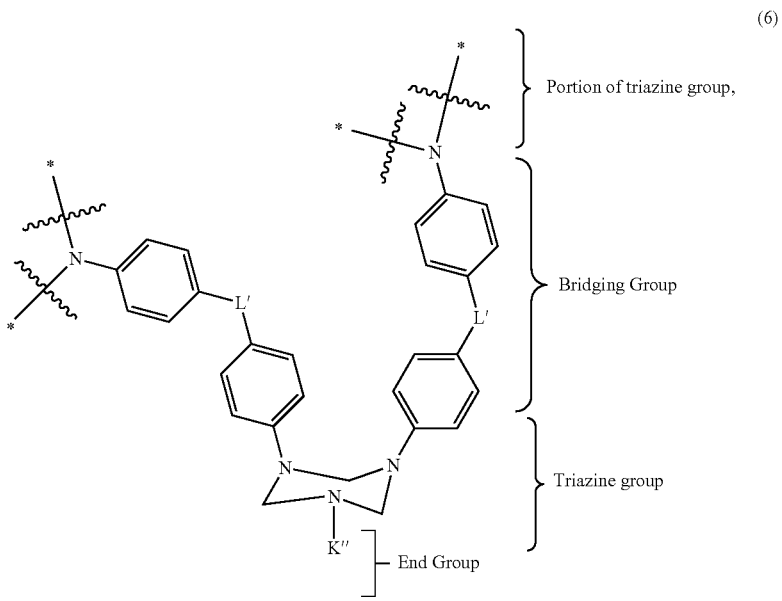

(6)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. K" is here a monovalent end group including at least one 6-carbon ring aromatic. Each nitrogen having two starred wavy bonds in formula (5) is a portion of a different hexahydrotriazine group.

For a PHT comprising a bridging group of formula (4) (see above) and an end group of formula (7):

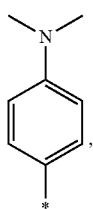

(7)

the PHT may be depicted using the following formula (8):

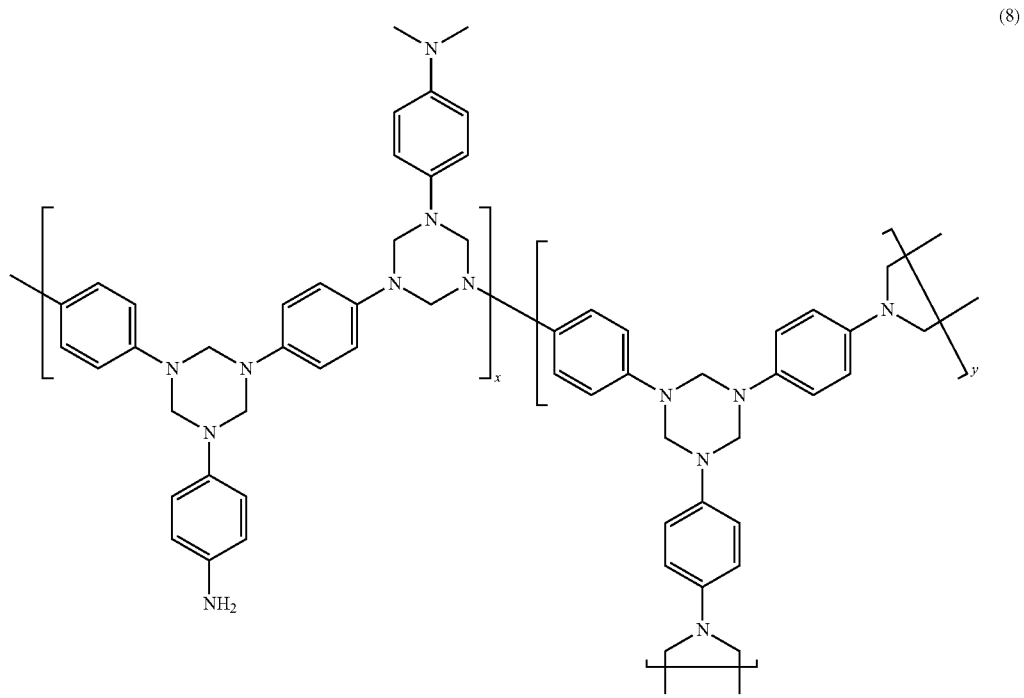

(8)

The polyhexahydrotriazine of formula (8) is an example of a PHT with reduced crosslink density and a more linear form. This PHT is a soluble, processable polymer. In this context, "polymer" includes an oligiomer comprising the same repeating units indicated in formula (8). In formula 8, "x" represents the overall percentage of linear repeat units in the PHT material and "y" represents the overall percentage of crosslinking units in the PHT material.

Exemplary non-limiting divalent bridging groups corresponding to formula (3) further include:

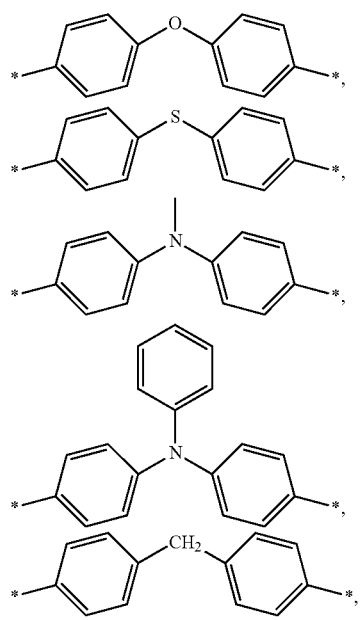

-continued and combinations thereof.

As discussed, embodiments of PHA and PHT further comprise monovalent aromatic groups K" (referred to herein as end groups), which do not participate in chemical crosslinking and therefore serve to control the crosslink density as well as the physical and mechanical properties of the PHA and PHT polymers. Monovalent end groups K" may have, for example, a structure corresponding to the following:

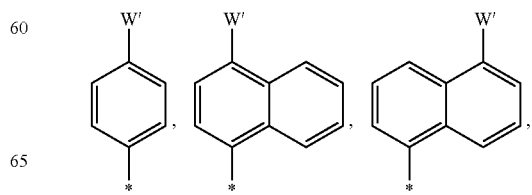

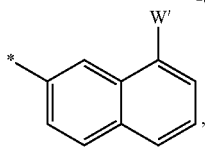

wherein W' is selected from the group consisting of: —H, —NH(R'), —N(R²)(R³), —OH, —O(R⁴), —S(R⁵), —P(R⁶), —R⁷—CF₃, and combinations thereof, wherein $R^1$ comprises at least 1 carbon, $R^2$ comprises at least 1 carbon, $R^3$ comprises at least 1 carbon, $R^4$ comprises at least 1 carbon, $R^5$ comprises at least 1 carbon, $R^6$ comprises at least 1 carbon, $R^7$ comprises at least one carbon, and each of $R^1$-$R^7$ may be independent or the same. The starred bond is linked to a nitrogen of a hemiaminal group or a nitrogen of a hexahydrotriazine group.

Non-limiting exemplary end groups K" further include:

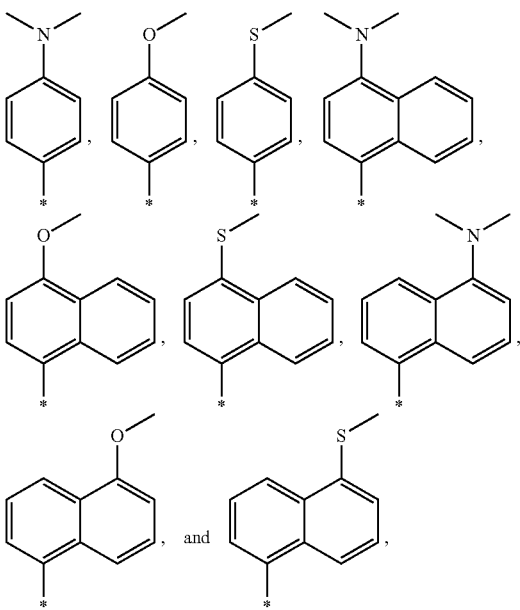

wherein the starred bond is linked to a nitrogen of a hemiaminal group or a nitrogen of a hexahydrotriazine group. End groups can be used singularly or in combination—that is, only a single end group type may be incorporated or two or more end group types may be incorporated into the final reaction product.

The reactivity of a given end group precursor may vary according to whether the substituent(s) attached to aromatic ring are electron rich or electron poor. In general, more strongly electron withdrawing (electron poor) substituents reduce reactivity of the monomer and more strongly electron donating (electron rich) substituents increase reactivity. As such, it is possible to control the ratio of different end groups in the final product by selecting end group precursors on the basis of expected reactivity (and/or adjusting feed ratios). Additionally, electron poor substituents react more slowly and can be used to vary the character of the reaction end-product between hemiaminal and hydrotriazine. That is, less reactive (electron poor) monomer units will tend produce a reaction product having more hemiaminal groups as compared to more reactive (electron rich) monomer units.

The ratio of bridging groups and end groups in the final reaction product can similarly be adjusted using the relative reactivity of the bridging group monomers and the end group monomers. A more reactive end group (e.g., one with a substituent which is electron rich) will tend to reduce cross-link density and molecular weight in the final polymer. A less reactive end group (e.g., one with a substituent which is electron poor) will tend to increase crosslink density because fewer hemiaminal or hexahydrotriazine groups will bond to such an end group and will instead be bonded only to bridging groups, which results in crosslinks.

A method of preparing a polyhemiaminal (PHA) comprising divalent bridging groups comprises forming a first mixture comprising i) a first monomer comprising two or more primary aromatic amine groups (e.g., corresponding to K' with primary amines (—NH₂) at the*locations)), ii) a second monomer having only one aromatic primary amine group (e.g., corresponding to K" with a primary amine at the*location), iii) paraformaldehyde, and iv) a solvent. The first mixture is then preferably heated at a temperature of about 20° C. to about 120° C. for about 1 minute to about 24 hours, thereby forming a second mixture comprising the PHA.

The mole ratio of paraformaldehyde to total moles of primary aromatic amine groups (e.g., 2×moles diamine monomer+1×moles monoamine monomer) is preferably about 1:1 to about 1.25:1, based on one mole of paraformaldehyde equal to 30 grams.

Non-limiting exemplary first monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

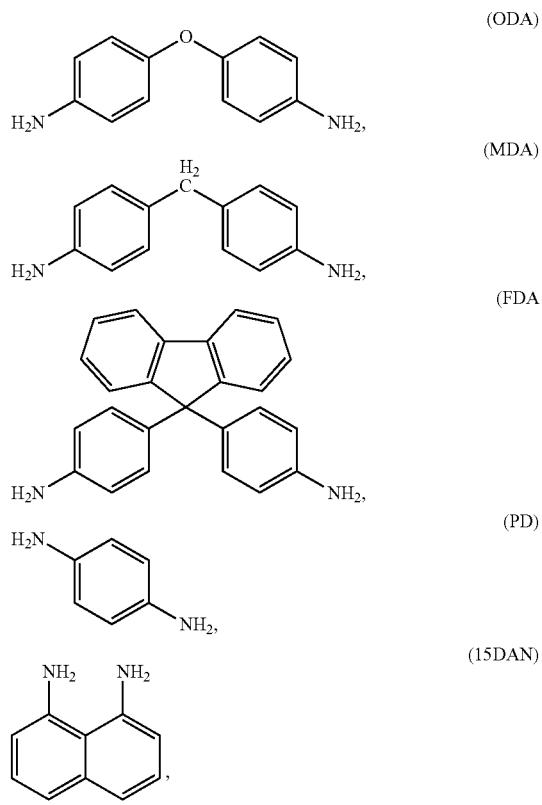

-continued

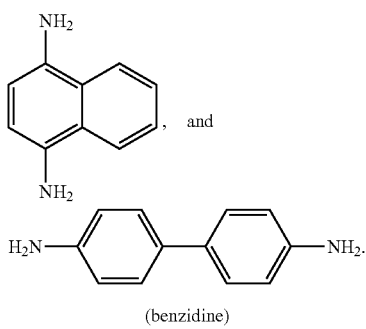

(14DAN)

(benzidine)

Non-limiting exemplary second monomers having only one primary amine include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

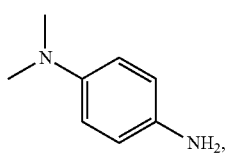

(DPD)

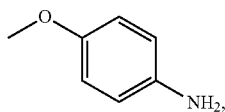

(MOA)

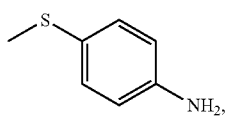

(MTA)

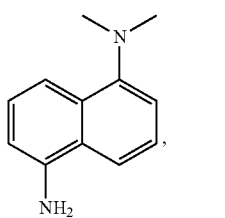

(15DMN)

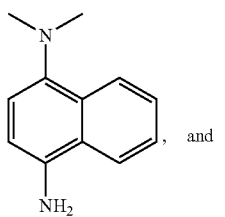

(14DMN)

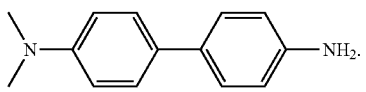

(DMB)

The second monomer can be used in an amount of 1 mole % to about 99 mole % based on total moles of first monomer and second monomer. In a particular embodiment, the second monomer can be used in an amount of 10 mole % to about 67 mole % based on total moles of first monomer and second monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). In a typical embodiment, the solvent is NMP.

A method of preparing a polyhexahydrotriazine (PHT) comprises forming a first mixture comprising i) a first monomer comprising two aromatic primary amine groups, ii) a second monomer having only one aromatic primary amine group, iii) paraformaldehyde, and iv) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

Also disclosed is a method of preparing a polyhemiaminal film, illustrated in the cross-sectional layer diagrams of FIG. 1. A mixture comprising a polyhemiaminal and a solvent prepared as described above is disposed on a surface 12 of a substrate 10, thereby forming structure 20 comprising an initial film layer 22 comprising the polyhemiaminal, solvent and/or water disposed on covered surface 24 of substrate 10. Initial film layer 22 is heated at a temperature of about 20° C. to about 120° C. for about 1 minute to about 24 hours, thereby forming structure 30 comprising polyhemiaminal (PHA) film layer 32 disposed on the covered surface 34 of substrate 10. PHA film layer 22 is substantially free of solvent and/or water.

The substrate can be any suitable substrate, in particular any substrate whose Young's modulus is a factor of 5 greater than the polyhemiaminal and/or polyhexahydrotriazine. Non-limiting examples of these materials include semiconductor wafers (e.g., silicon wafers), most metals, refractory materials, and possibly harder polymers.

The solvent mixture containing the PHA can be cast onto the substrate using any suitable coating technique (e.g., spin coating, dip coating, roll coating, spray coating, and the like).

Figure 2:
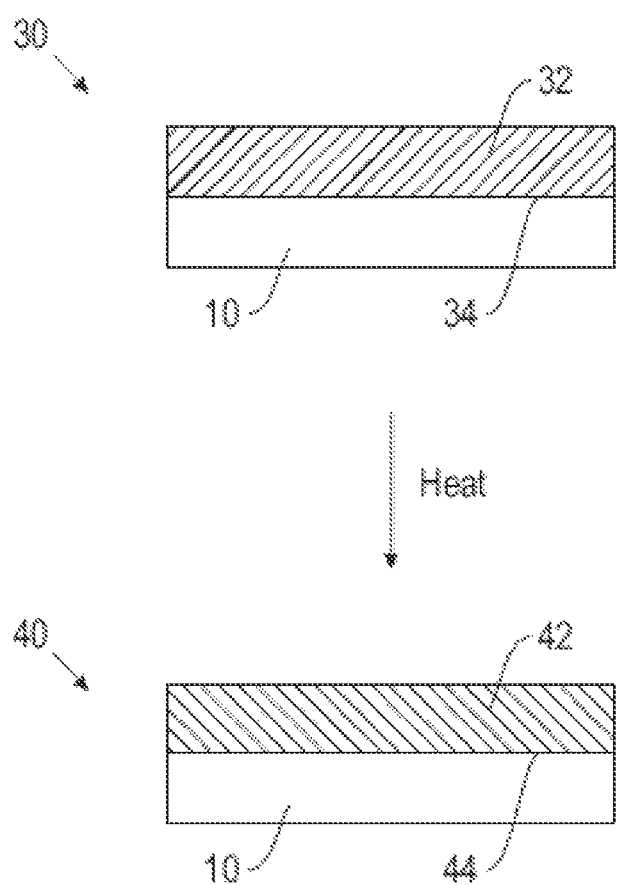
FIG. 2 is a series of cross-sectional layer diagrams illustrating the preparation of a polyhexahydrotriazine (PHT) film.

Also disclosed is a method of preparing a polyhexahydrotriazine (PHT) film from a PHA film, illustrated in the cross-sectional layer diagrams of FIG. 2. The polyhemiaminal film layer 32 of structure 30 can be heated at a temperature of at least 150° C., preferably about 165° C. to about 280° C. even more preferably at about 180° C. to about 220° C., and most preferably at about 200° C., thereby forming structure 40 comprising polyhexahydrotriazine (PHT) film layer 42 disposed on covered surface 44 of substrate 10. The heating time at any of the above temperatures can be about 1 minute to about 24 hours. PHT film layer 42 is substantially free of solvent and water. The hemiaminal groups of the PHA film are substantially or wholly converted to hexahydrotriazine groups by heating the PHA film at a temperature in this range.

The number average molecular weight (Mn) of the PHA and/or PHT polymers in certain embodiments can be in a range of 1000 to 500,000, preferably in a range of 1000 to 50,000, and most preferably in a range of 1000 to 20,000.

The polyhexahydrotriazines are attractive for applications requiring lightweight, rigid, strong thermosets such as aerospace engineering, electronics, and as mixtures for increasing the modulus of known resins and composites. When end group monomers are incorporated to limit resin crosslink density, the resulting PHA and PHT monomers have improved properties with respect to applications related to processing for molding applications and film and fiber formation. That is, highly cross-linked PHA and PHT materials have comparatively low post-synthesis workability as compared to PHA and PHT materials with lower cross-link density.

Figure 3:
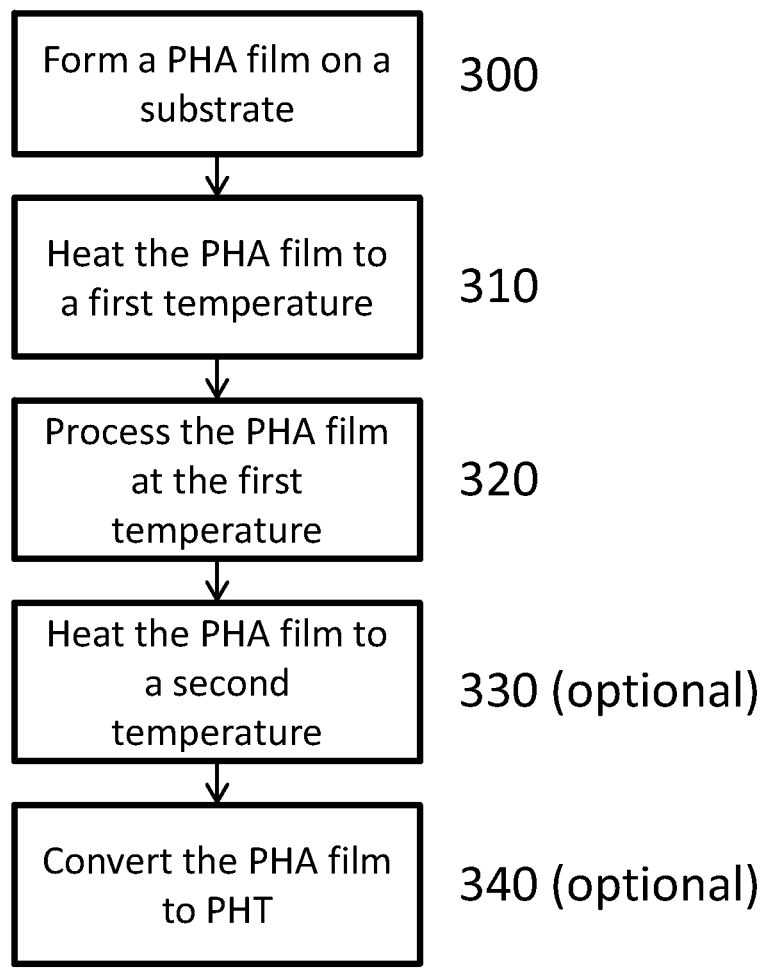
FIG. 3 depicts a method of coating a component with a polymer.

FIG. 3 depicts an embodiment of a method for coating a component with a polymer. In element 300 of the method, a PHA film is formed on a substrate. The substrate in this example is a microelectronic component and the polymer is to be a portion of microelectronic packaging for protection against environmental contaminants, physical abrasion, or the like. In element 310, the PHA film is heated to a first temperature that is above a glass transition temperature of the PHA film. When a polymer has a glass transition temperature ($T_g$), the polymer behaves in the manner of a rubber material at temperatures above the glass transition temperature. When in a rubber-like state the polymer may be more processable/moldable.

In element 320, the PHA is processed, for example, molded to a predetermined shape. The processing and heating may occur simultaneously or in sequence. The heated, above $T_g$ polymer may more easily fill gaps, pores, cracks or the like than when in a glassy (sub-$T_g$) state. Additionally, the PHA and PHT materials are also solvent soluble, and this allows them to be processed by solvent filling or casting applications. It is also possible in some embodiments to prepare PHA/PHT materials by forming a pre-polymer liquid (e.g., monomeric/oligiomeric materials) and then cure (polymerize) the PHA/PHT material in a desired location using the described curing processes.

In element 330, the PHA film is heated to a second temperature that is greater than the first temperature. In this embodiment, the second temperature is at or above a temperature at which the PHA film converts to a polyhexahydrotriazine (PHT) film (element 340).

The PHA film used in this example comprises a plurality of trivalent hemiaminal groups having the structure (5):

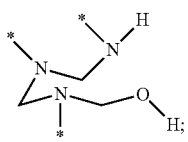

and
a plurality of bridging groups of formula (2):

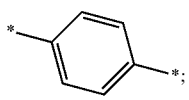

and
a plurality of monovalent end groups of formula (3):

wherein W' is selected from the group consisting of: —H, —NH(R'), —N(R$^2$)(R$^3$), —OH, —O(R$^4$), —S(R$^5$), —P(R$^6$), —R$^7$—CF$_3$, and combinations thereof, wherein R$^1$ comprises at least 1 carbon, R$^2$ comprises at least 1 carbon, R$^3$ comprises at least 1 carbon, R$^4$ comprises at least 1 carbon, R$^5$ comprises at least 1 carbon, R$^6$ comprises at least 1 carbon, R$^7$ comprises at least one carbon, and each of R$^1$-R$^7$ may be independent or the same. Each starred bond of a given hemiaminal group is covalently linked to a respective one of the bridging groups (formula (2)) or a respective one of the monovalent end groups (formula (3)). Each starred bond of a given bridging group is linked to one of the hemiaminal groups. And each starred bond of a given monovalent end group is linked to one of the hemiaminal groups. As an example, the resulting PHT material has the structure depicted by formula (17).

The following examples illustrate the preparation of the PHA and PHT solids and films, and the characterization of their physical properties.

EXAMPLES

Materials used in the following examples are listed in Table 1.

TABLE 1

| ABBREVIATION | DESCRIPTION | SUPPLIER |
| --- | --- | --- |
| PF | Paraformaldehyde | Sigma Aldrich |
| PD | p-Phenylenediamine | Sigma Aldrich |
| | 4-Å molecular sieves | Sigma Aldrich |
| DMF | Dimethylformamide | Sigma Aldrich |
| NMP | N-Methylpyrollidone | Sigma Aldrich |
| DPD | N,N-dimethyl-p-phenylenediamine | Sigma Aldrich |
| HTPT | Hexahydro-1,3,5-triphenyl-1,3,5-triazine | Prepared below |
| MDA | 4,4'-Methylenedianiline | Sigma Aldrich |
| ODA | 4,4'-Oxydianiline | Sigma Aldrich |
| FDA | 4,4'-(9-fluorenylidene)dianiline, MW 348.4 | Sigma Aldrich |

Herein, Mn is the number average molecular weight, Mw is the weight average molecular weight, and MW is the molecular weight of one molecule.

N-Methyl-2-pyrrolidone (NMP), paraformaldehyde, 4,4'-diaminephenylmethane (MDA), and 4,4'-(9-fluorenylidene)dianiline (FDA) were purchased from Aldrich and used as received. 4,4'-Oxydianiline (ODA) was purchased from Aldrich, rinsed with acetone and dried in an Abderhalden drying pistol overnight prior to use. d$_9$-NMP, d$_6$-DMSO and CDCl$_3$ were purchased from Cambridge Isotope Laboratories (CIL) and used as received. d$_9$-NMP, d$_6$-DMSO and CDCl$_3$ were purchased from Cambridge Isotope Laboratories (CIL) and used as received.

$^1$H NMR spectra were recorded on a Bruker Avance 400 spectrometer (400 MHz). Chemical shifts are reported in ppm from tetramethylsilane with the solvent resonance as the internal standard (CDCl$_3$: delta 7.26 ppm; d$_6$-DMSO: delta 2.50 ppm; d$_9$-NMP: delta 3.23, 2.58, 1.80; d$_6$-acetone: delta 2.05 ppm).

$^{13}$C NMR spectra were recorded on a Bruker Avance 400 spectrometer (100 MHz) spectrometer with complete proton decoupling. Chemical shifts are reported in ppm from tetramethylsilane with the solvent resonance as the internal standard (CDCl$_3$: delta 77.16 ppm; d$_6$-DMSO: delta 39.51). Data are reported as follows: chemical shift, integration, multiplicity (s=singlet, d=doublet, t=triplet, q=quartet, sep=septet, bs=broad singlet, m=multiplet), and coupling constants (Hz).

Gel permeation chromatography (GPC) was performed in THF or DMF using a Waters system equipped with four 5-micrometer Waters columns (300 mm×7.7 mm) connected in series with an increasing pore size (100, 1000, 10$^5$, 10$^6$ Å), a Waters 410 differential refractometer, and a 996 photodiode array detector. The system was calibrated with polystyrene standards.

Syntheses

Example 1 (Comparative)

Reaction of aniline with paraformaldehyde to form hexahydrotriazine compound 4,4',4''-(1,3,5-triazinane-1,3,5-triyl)tris(N,N-dimethylaniline) (HTPT).

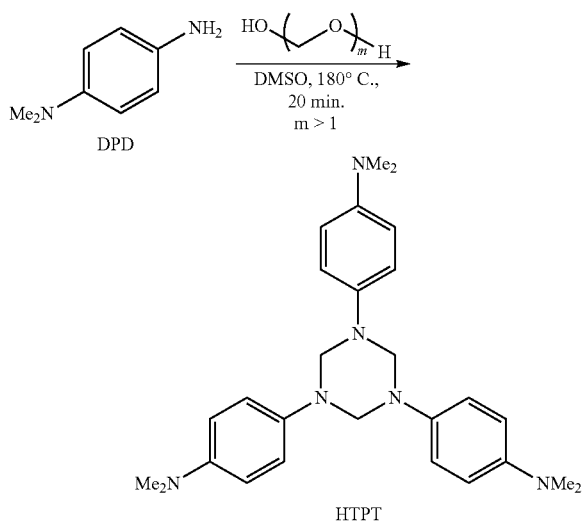

N,N-dimethyl-p-phenylenediamine (DPD, 0.21 g, 0.15 mmol) and paraformaldehyde (PF, 0.0046 g, 0.15 mmol, 1 equivalent (eq.)) were weighed out into a 2-Dram vial inside a glovebox. DMSO (0.91 g, 1.0 mL) was added. The reaction mixture was removed from the glovebox, and heated in an oil bath at 180° C. for 20 minutes. The DMSO was removed in vacuo and 4,4',4''-(1,3,5-triazinane-1,3,5-triyl)tris(N,N-dimethylaniline) was collected as a brown solid (0.04 g, 79% yield).

Figure 4:
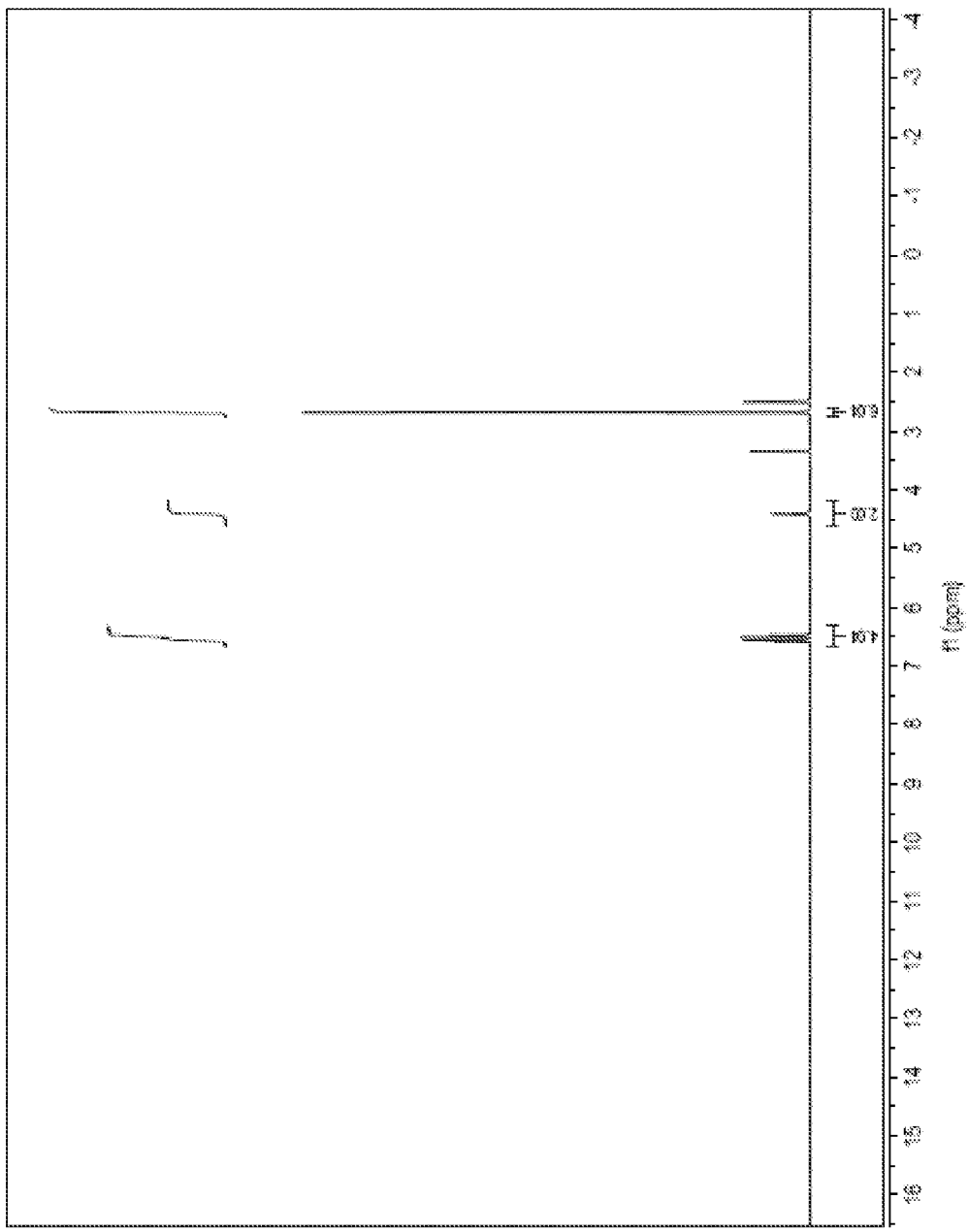
FIG. 4 is a $^1$H NMR spectrum of N,N-dimethyl-p-phenylenediamine in $d_6$-DMSO.
Figure 5:
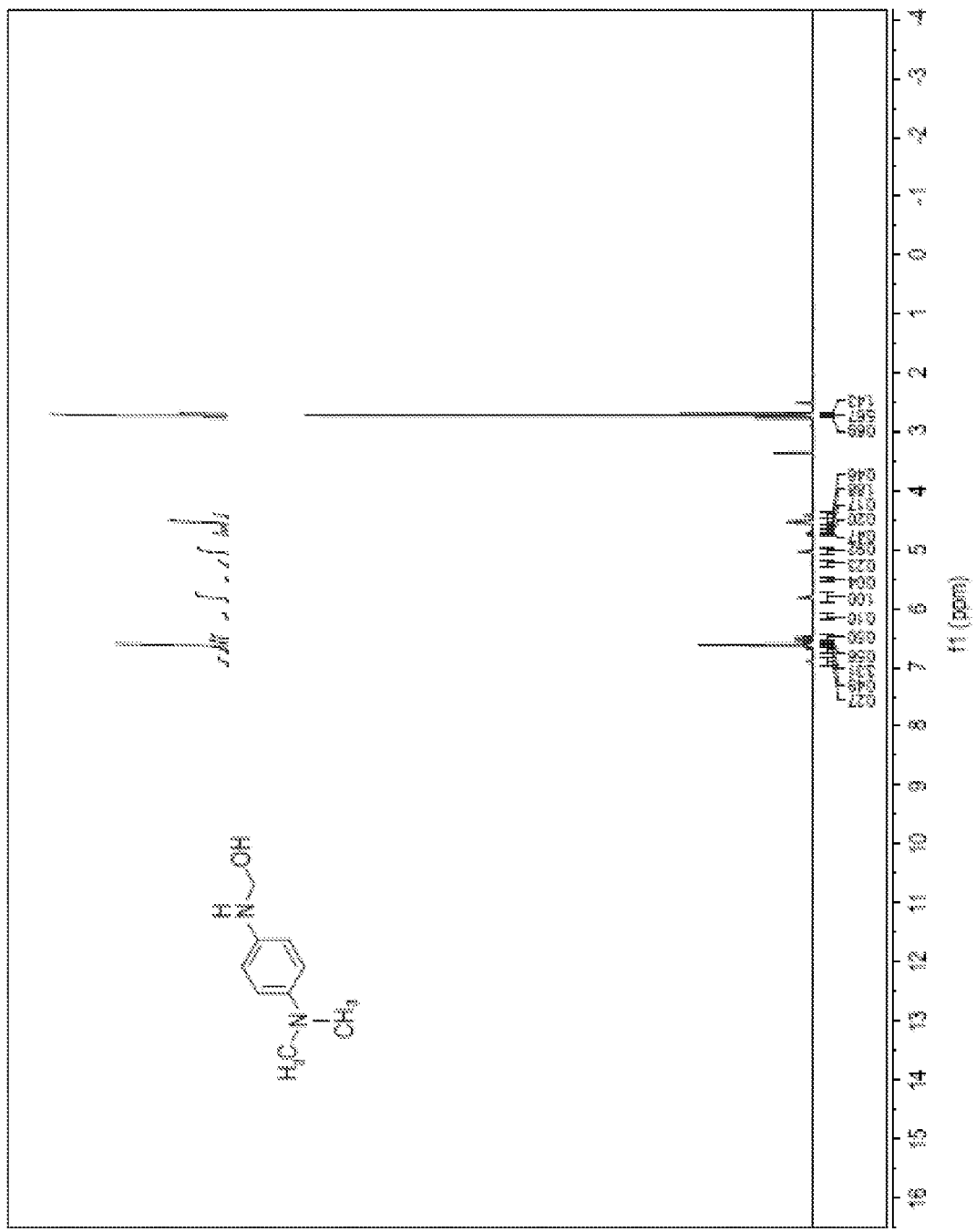
FIG. 5 is a $^1$H NMR spectrum of a hemiaminal formed by the reaction of N,N-dimethyl-p-phenylenediamine with paraformaldehyde.
Figure 6:
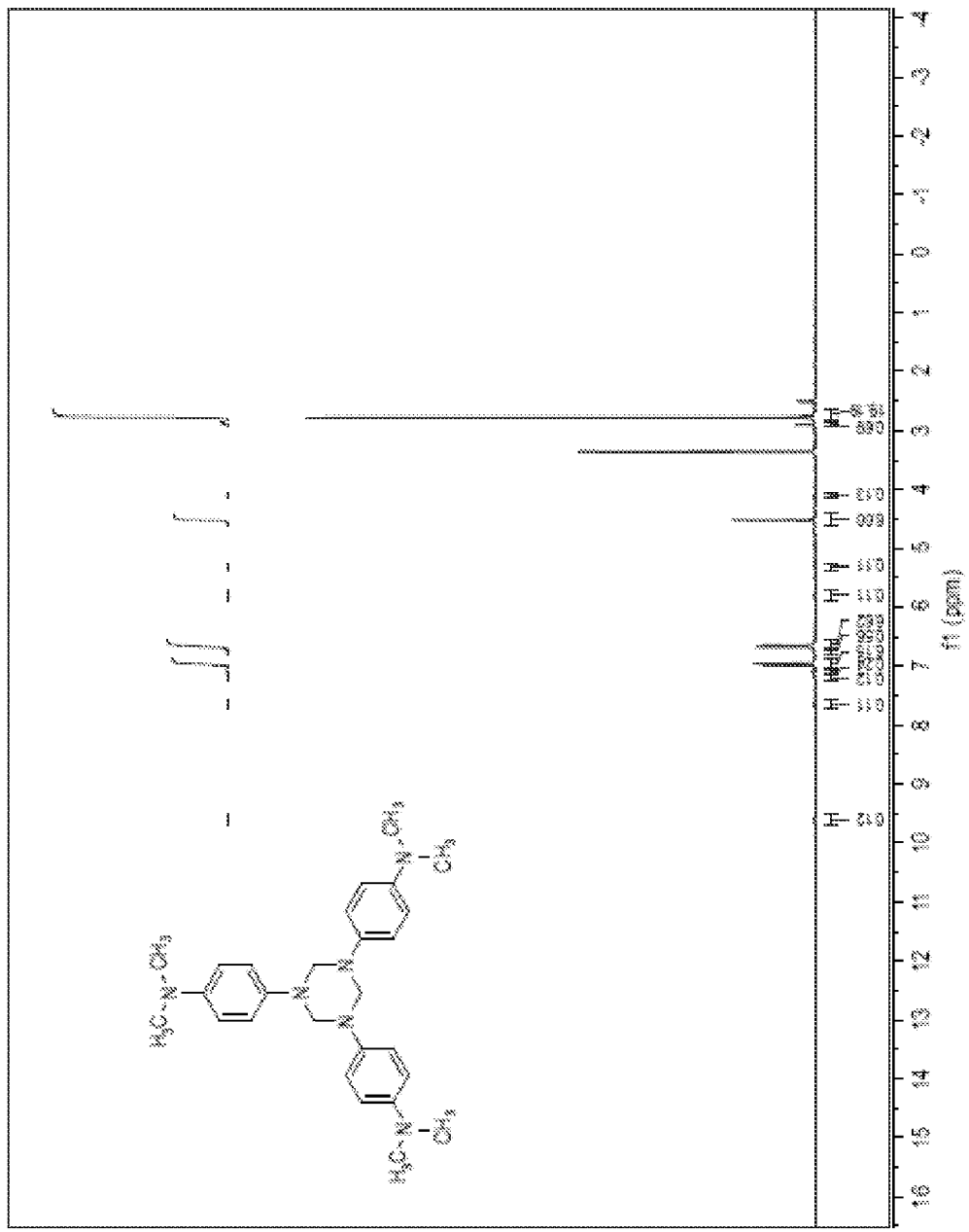
FIG. 6 is a $^1$H NMR spectrum of crude 4,4',4"-(1,3,5-triazinane-1,3,5-triyl)tris(N,N-dimethylaniline) formed by the reaction of N,N-dimethyl-p-phenylenediamine with paraformaldehyde (Example 1).

The following procedure was used for a $^1$H NMR time study of hemiaminal formation. DPD (0.021 g, 1.6 mmol (FIG. 4, $^1$H NMR)) and PF (0.0057 g, 1.9 mmol, 1.2 eq.) were carefully weighed into a dried 2-Dram vial with stirbar in the dry box and d$_6$-DMSO (1.0 mL, 1.6 M) was added by syringe. The mixture was transferred to a dried NMR tube and the condensation reaction was monitored over time. At 50° C. (FIG. 5, $^1$H NMR), there are signals corresponding to the formation of hemiaminal, and no hexahydrotriazine is observed. After heating at 180° C., however, >98% conversion to the hexahydrotriazine product HTPT is observed (FIG. 6, $^1$H NMR).

Figure 7:
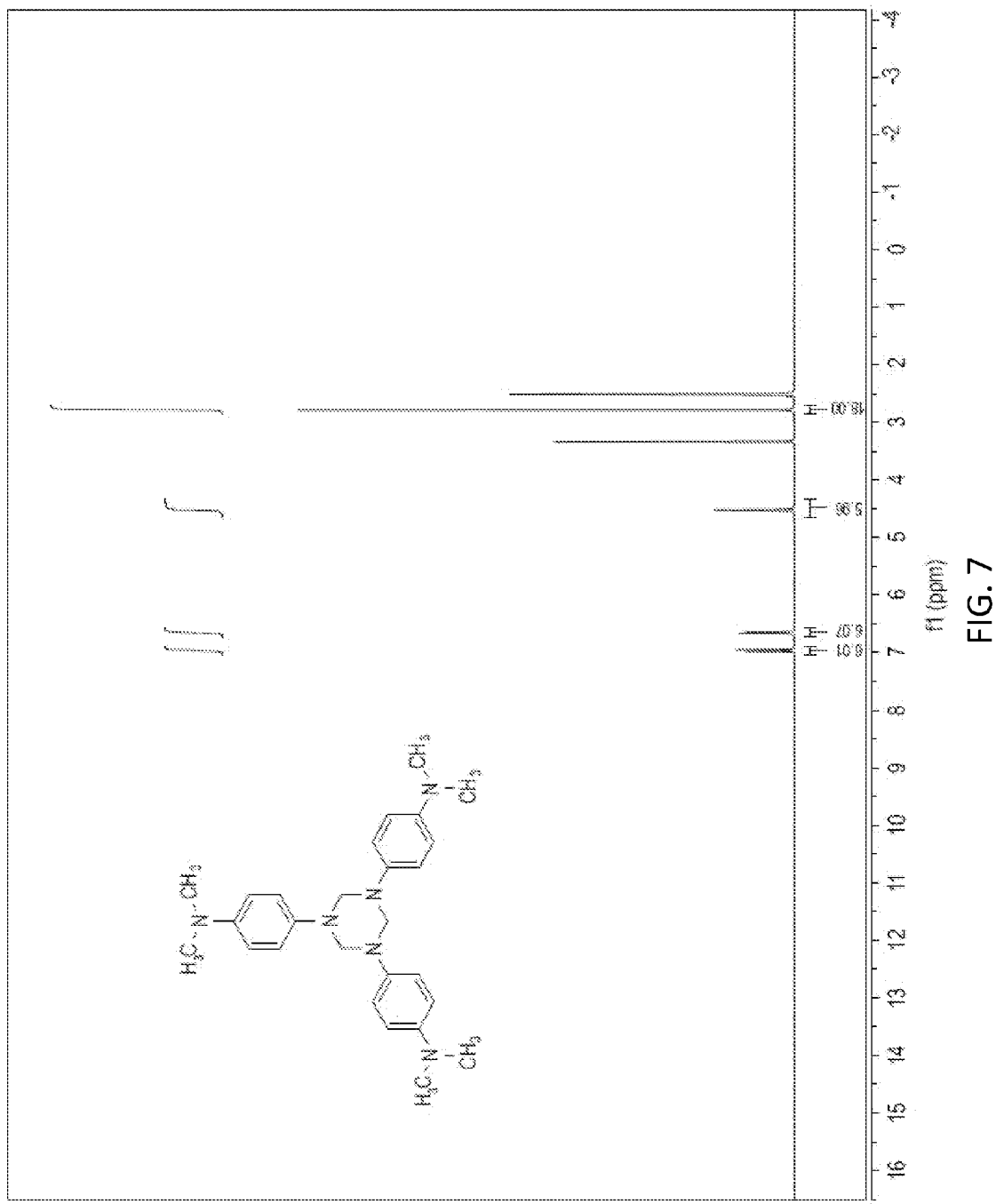
FIG. 7 is a $^1$H NMR spectrum of purified 4,4',4"-(1,3,5-triazinane-1,3,5-triyl)tris(N,N-dimethylaniline) formed in Example 1.

The purified HTPT has a singlet resonating at delta 4.5 ppm (FIG. 7, $^1$H NMR spectrum) for the six methylene protons of HTPT. $^1$H NMR (d$_6$-DMSO, 400 MHz): delta 6.97 (d, 2H, J=8 Hz), 6.66 (d, 2H, J=8 Hz), 4.53 (s, 2H), 2.78 (s, 6H) ppm.

Example 2 (Comparative)

Preparation of polyhemiaminal P-1 by reaction of 4,4'-oxydianiline (ODA) with paraformaldehyde (PF). The product is a powder.

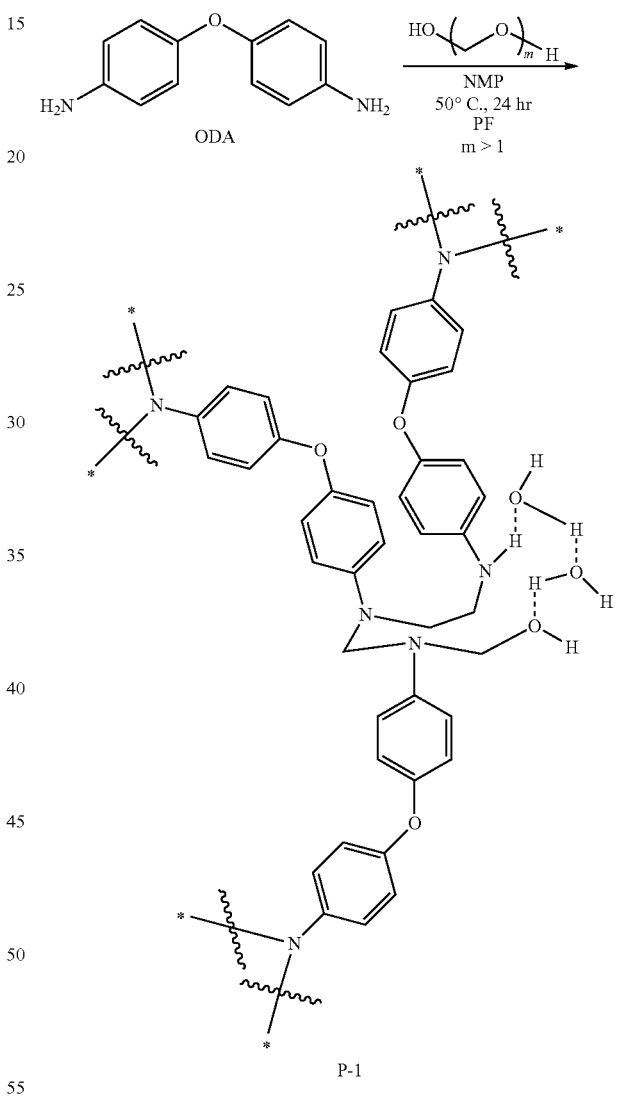

Figure 8:
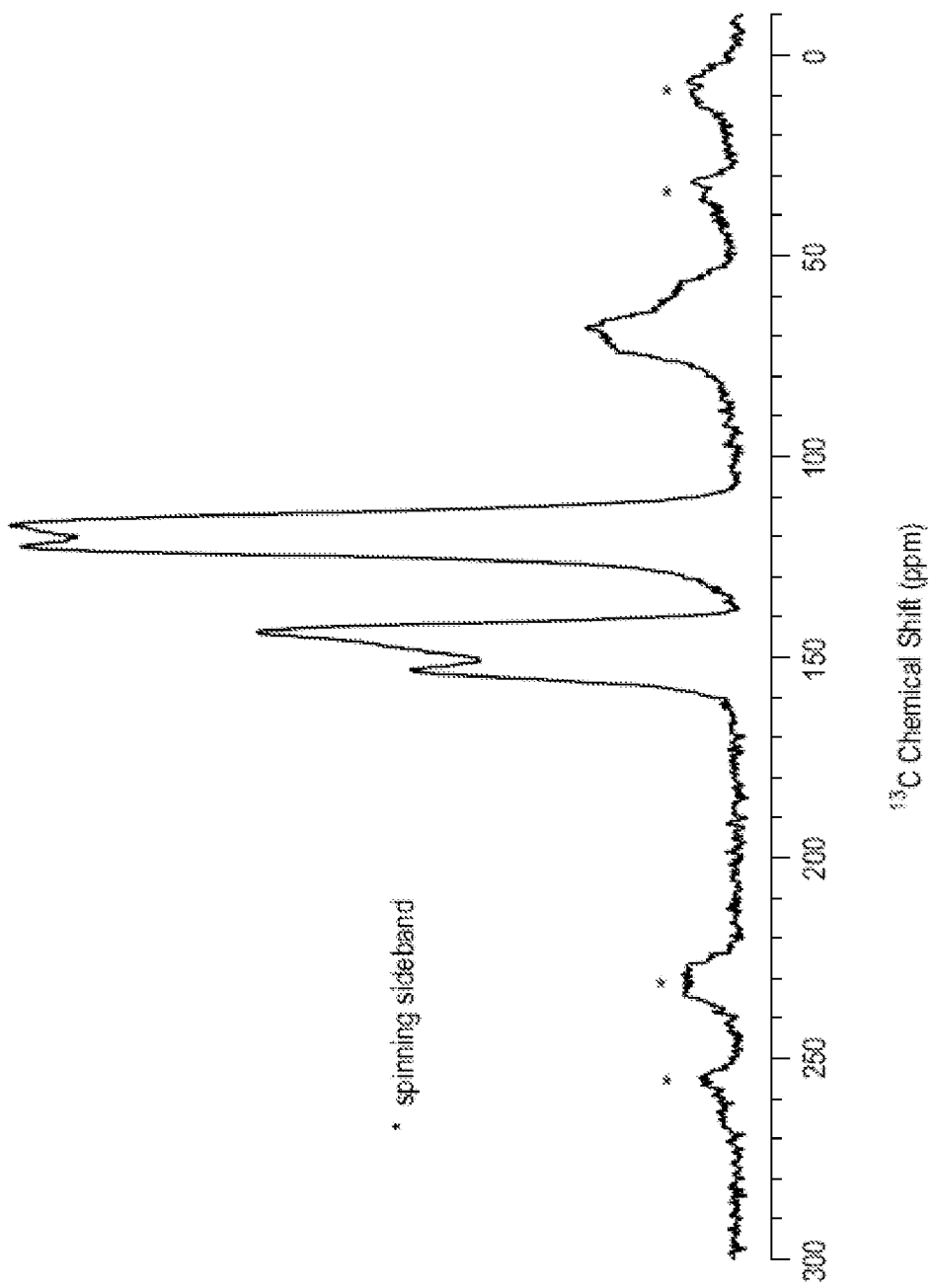
FIG. 8 is a solid state $^{13}$C NMR spectrum of the polyhemiaminal formed in Example 2.

4,4'-Oxydianiline (ODA, 0.20 g, 1.0 mmol) and paraformaldehyde (PF, 0.15 g, 5.0 mmol, 5 equivalents (eq.)) were weighed out into a 2-Dram vial inside a N$_2$-filled glovebox. N-methylpyrrolidone (NMP, 6.2 g, 6.0 mL) was added (0.17 M). The vial was capped but not sealed. The reaction mixture was removed from the glovebox, and heated in an oil bath at 50° C. for 24 hours (after approximately 0.75 hours, the polymer begins to precipitate in NMP). The polyhemiaminal P-1 was precipitated in acetone or water, filtered and collected to yield 0.22 g, >98% yield as a white solid. $^{13}$C NMR (solid-state): 70, 120, and 145 ppm (FIG. 8).

Example 3 (Comparative)

Preparation of polyhexahydrotriazine P-2 by reaction of p-phenylenediamine (PPD) and paraformaldehyde (PF). Product precipitates in water.

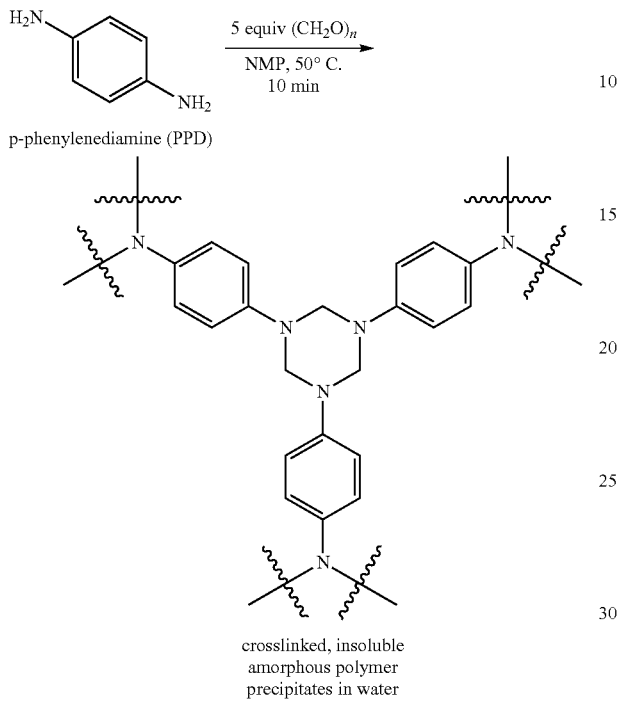

crosslinked, insoluble amorphous polymer precipitates in water p-Phenylenediamine (PPD, 0.11 g, 1.0 mmol) and paraformaldehyde (PF, 0.15 g, 5.0 mmol, 5 equivalents (eq.)) were weighed out into a 2-Dram vial inside a $N_2$-filled glovebox. N-methylpyrrolidone (NMP, 6.2 g, 6.0 mL) was added (0.17 M). The vial was capped but not sealed. The reaction mixture was removed from the glovebox, and heated in an oil bath at 50° C. for 10 minutes hours. The polyhexahydrotriazine P-2 was precipitated in water, filtered and collected to as an off-white solid. $^{13}$C NMR (solid-state): 70, 120, and 145 ppm.

Example 4

Preparation of polyhexahydrotriazine P-3 by reaction of p-phenylenediamine (PPD), N,N-dimethyl-p-phenylenediamine (DPD), and paraformaldehyde (PF). Product precipitates in diethylether and is soluble in dimethylformamide (DMF).

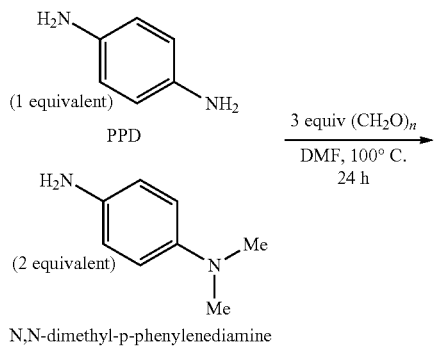

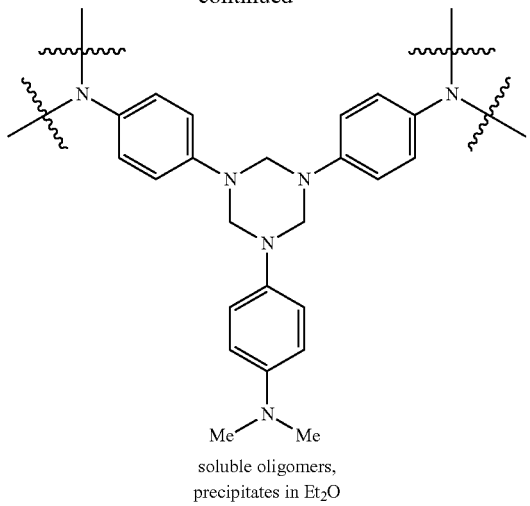

soluble oligomers, precipitates in Et$_2$O

Para-formaldehyde (0.090 g, 3.0 mmol), N,N-dimethyl-amino p-phenylenediamine (0.136 g, 1.0 mmol), and p-phenylenediamine (0.216 g, 2.0 mmol) were weighed out into a flask inside the glovebox. DMF was added (25% solids) and 0.400 g of 4-A molecular sieves were added to the flask to remove water over the course of the reaction. The reaction mixture was removed from the glovebox, and set up to heat in an oil bath set to 100° C. The reaction mixture was allowed to stir for 3.25 hours (after approximately 6 hours, the polymer begins to precipitate from the DMF solution). The resulting polymer was precipitated in diethylether, filtered and collected to yield 0.196 g, 70% yield as a brown solid. (Mn=15,069 Mw=21,560 PDI=1.43).

Figure 9:
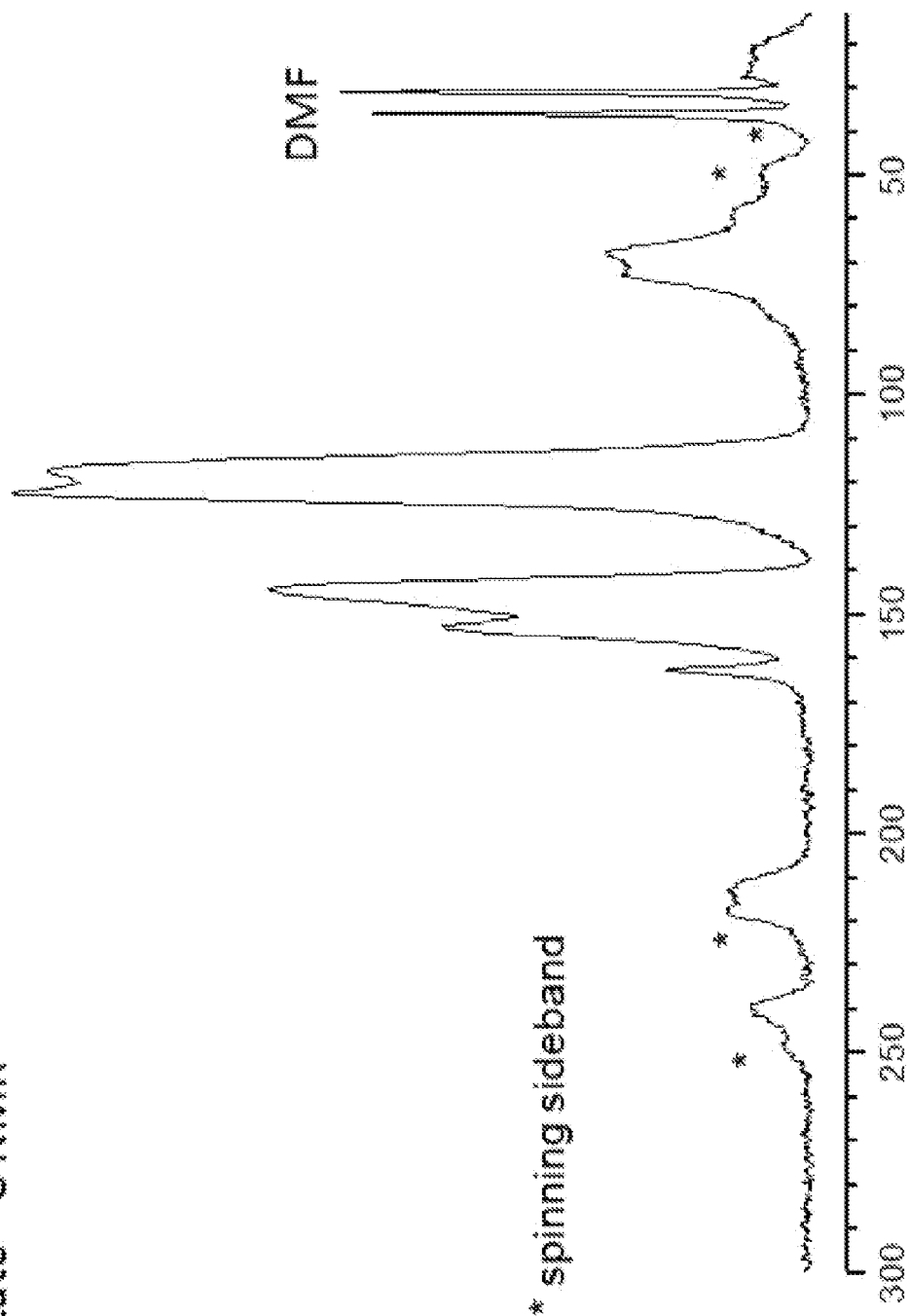
FIG. 9 is a $^1$H NMR spectrum of a polymer formed in Example 4.
Figure 10:
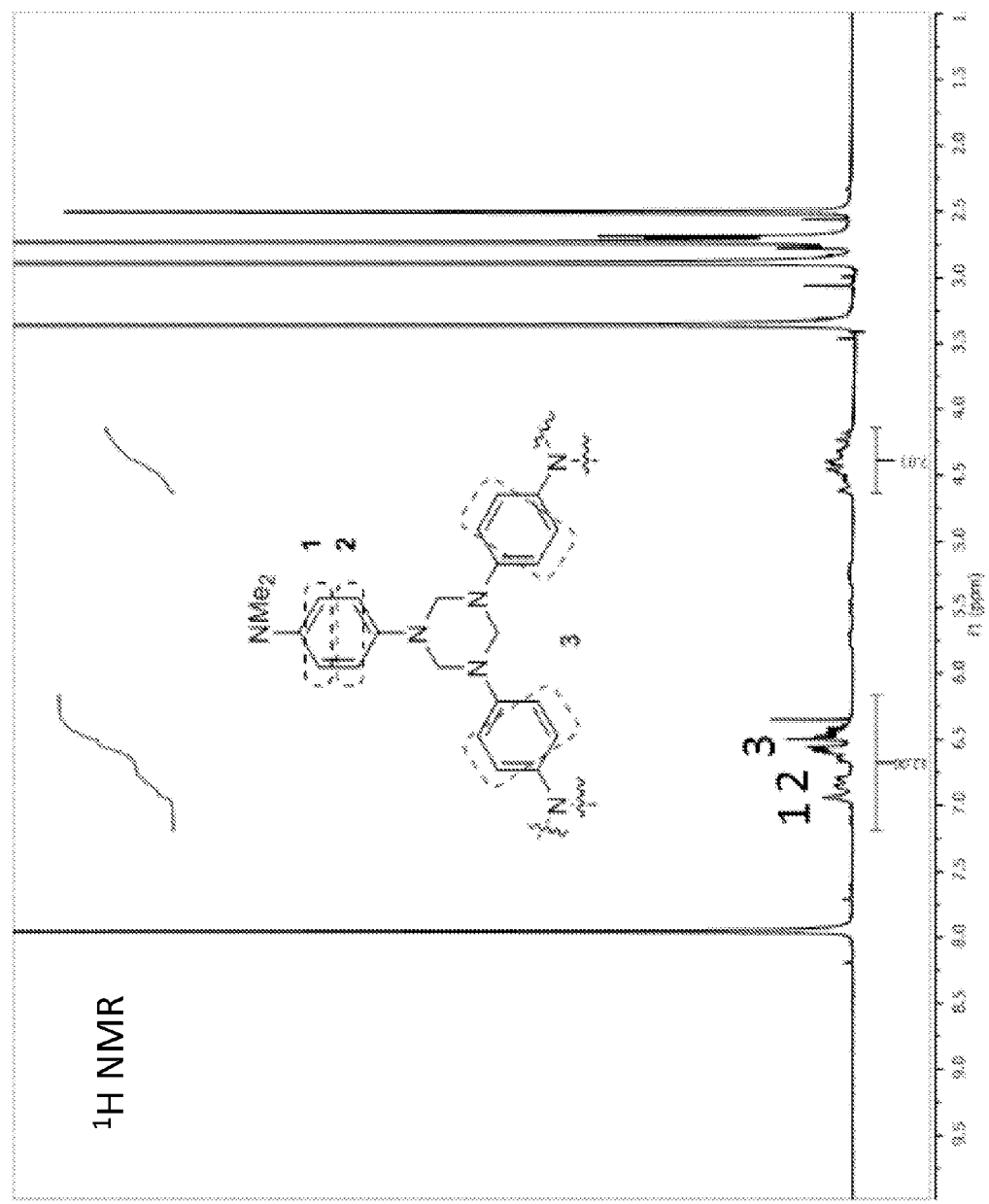
FIG. 10 is a solid state $^{13}$C NMR spectrum of a polymer formed in Example 4.

FIG. 9 is $^1$H NMR data (sample collected after 3.25 hours) on the reaction product. $^1$H NMR data is consistent with hexahydrotriazine formation as new signals were observed in the diagnostic methylene region between δ 4.0-5.0 ppm as well as downfield signals corresponding to electronically differentiated aromatic protons. FIG. 10 is a solid state $^{13}$C NMR spectrum further confirming the formation of the polymer of example 4.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method of coating a component with a polymer, the method comprising: forming a polyhemiaminal (PHA) film on a substrate, the PHA film comprising:
a plurality of trivalent hemiaminal groups having the structure:

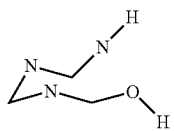

a plurality of divalent and/or trivalent bridging groups having the structure:

wherein K' comprises at least one 6-carbon aromatic ring; and
a plurality of monovalent end groups having the structure:

wherein K" comprises at least one carbon atom, and
each nitrogen in the plurality of trivalent hemiaminal groups is directly covalently linked to a starred bond of one of the plurality of bridging groups or a starred bond of one of the plurality of end groups,
wherein a ratio of bridging groups to end groups in the PHA film is less than 3:1 and greater than or equal to 1:2; and
heating the PHA film to a first temperature above a glass transition temperature of the PHA film.

2. The method of claim 1, further comprising:
molding the PHA film while at or above the first temperature.

3. The method of claim 1, further comprising:
heating the PHA film to a second temperature that is above the first temperature to convert the PHA film to a polyhexahydrotriazine (PHT).

4. The method of claim 1, wherein the bridging group has the structure:

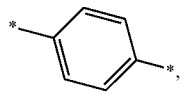

and
the end group has the structure:

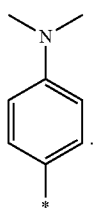

5. The method of claim 1, wherein the substrate includes a microelectronic component.

6. The method of claim 1, wherein the PHA film is formed on the substrate by spin casting.

7. The method of claim 1, wherein the bridging group is:

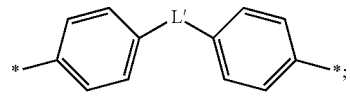

wherein L' is a divalent linking group selected from the group consisting of O, S, N(R'), N(H), R", P(R'''), wherein R', R", and R''' independently comprise at least 1 carbon atom.

8. The method of claim 1, wherein at least one end group is selected from the group consisting of:

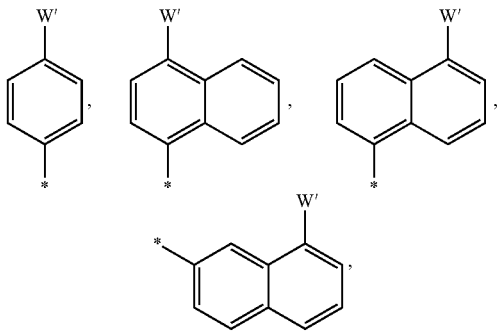

and combinations thereof, wherein W' is selected from the group consisting of: H, NH(R$^1$), N(R$^2$)(R$^3$), OH, O(R$^4$), S(R$^5$), P(R$^6$), R$^7$, CF$_3$, wherein R$^1$-R$^7$ each comprise at least 1 carbon atom, and each of R$^1$-R$^7$ may be the same or different.

9. The method of claim 1, wherein a glass transition temperature of the PHA film is below 185° C.

10. A method of forming a polymeric coating, the method comprising: forming a polyhemiaminal (PHA) material comprising:
a plurality of trivalent hemiaminal groups having the structure:

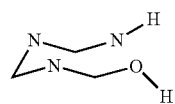

a plurality of divalent and/or trivalent bridging groups having the structure:

wherein K' comprises at least one 6-carbon aromatic ring; and
a plurality of monovalent end groups having the structure:

wherein K" comprises at least one carbon atom, and
each nitrogen in the plurality of trivalent hemiaminal groups is directly covalently linked to a starred bond of one of the plurality of bridging groups or a starred bond of one of the plurality of end groups;

heating the PHA material to a first temperature above a glass transition temperature of the PHA material; and molding the PHA material while at or above the first temperature.

11. The method of claim 10, wherein a ratio of bridging groups to end groups in the PHA material is less than 3:1 and greater than or equal to 1:2.

12. The method of claim 10, further comprising:

heating the PHA material to a second temperature that is above the first temperature to convert the PHA material to a polyhexahydrotriazine (PHT) material.

13. The method of claim 10, wherein the bridging group has the structure:

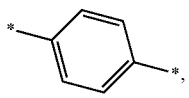

and the end group has the structure:

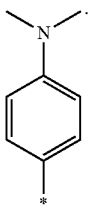

14. The method of claim 10, wherein the PHA material is formed on a substrate.

15. The method of claim 14, wherein a microelectronic component is disposed on the substrate.

16. The method of claim 14, wherein the PHA material is spin cast onto the substrate.

17. The method of claim 10, wherein the bridging group is:

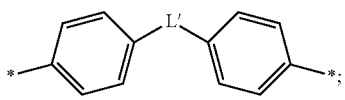

wherein L' is a divalent linking group selected from the group consisting of O, S, N(R'), N(H), R", P(R'"), wherein R', R", and R'" independently comprise at least 1 carbon atom.

18. The method of claim 10, wherein at least one end group is selected from the group consisting of:

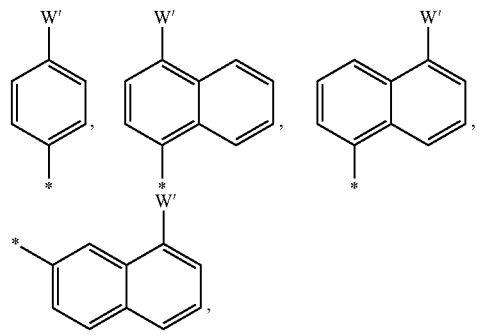

and combinations thereof, wherein W' is selected from the group consisting of: H, NH($R^1$), N($R^2$)($R^3$), OH, O($R^4$), S($R^5$), P($R^6$), $R^7$, $CF_3$, and combinations thereof, wherein $R^1$-$R^7$ each comprise at least 1 carbon atom, and each of $R^1$-$R^7$ may be the same or different.

19. The method of claim 10, wherein a glass transition temperature of the PHA material is below 185° C.

20. A method of coating a component with a polymer, the method comprising: forming a polyhemiaminal (PHA) film on a substrate, the PHA film comprising:

a plurality of trivalent hemiaminal groups having the structure:

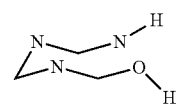

a plurality of bridging groups having the structure:

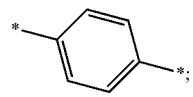

and a plurality of end groups having the structure:

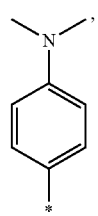

and each nitrogen in the plurality of trivalent hemiaminal groups is directly covalently linked to a starred bond of one of the plurality of bridging groups or a starred bond of one of the plurality of end groups; and heating the PHA film to a first temperature above a glass transition temperature of the PHA film.

* * * * *